United States Patent [19]
Bryant et al.

[11] Patent Number: 5,845,758
[45] Date of Patent: Dec. 8, 1998

[54] RESERVOIR FOR CIGARETTES WITH MAXIMUM TIME MONITORING

[75] Inventors: Leonard James Bryant; Peter Alec Clarke; Kerry Hierons; Robert Howard Taylor; Neil Thorp, all of High Wycombe, Great Britain

[73] Assignee: Molins PLC, Milton Keynes, Great Britain

[21] Appl. No.: 571,238

[22] Filed: Dec. 12, 1995

[30] Foreign Application Priority Data

| Dec. 12, 1994 | [GB] | United Kingdom | ................... | 9425157 |
| May 30, 1995 | [GB] | United Kingdom | ................... | 9510918 |
| Nov. 27, 1995 | [GB] | United Kingdom | ................... | 9524179 |

[51] Int. Cl.$^6$ ..................................................... B65G 1/00
[52] U.S. Cl. ..................................... 198/347.3; 198/347.1
[58] Field of Search ............................. 198/347.1, 347.2, 198/347.3

[56] References Cited

U.S. PATENT DOCUMENTS

| 4,149,545 | 4/1979 | Hall | ...................................... | 198/347.3 |
| 4,323,624 | 4/1982 | Molins et al. | ........................ | 198/347.3 |
| 4,503,965 | 3/1985 | Applegate et al. | .................. | 198/347.3 |
| 4,790,422 | 12/1988 | Clarke et al. | ........................ | 198/347.3 |
| 4,872,543 | 10/1989 | Hinchcliffe | ............................ | 198/347.3 |
| 4,962,840 | 10/1990 | Miura et al. | .......................... | 198/347.1 |
| 5,361,888 | 11/1994 | Brown et al. | ......................... | 198/347.3 |
| 5,439,092 | 8/1995 | Hierons | .................................. | 198/347.3 |
| 5,478,184 | 12/1995 | Bryant et al. | ........................ | 198/347.1 |

FOREIGN PATENT DOCUMENTS

| 0 581 143 A1 | 5/1994 | European Pat. Off. . |
| 1299174 | 12/1972 | United Kingdom . |
| 1301843 | 1/1973 | United Kingdom . |
| 2 133 759 | 8/1984 | United Kingdom . |
| 2 263 680 | 8/1993 | United Kingdom . |

*Primary Examiner*—Karen M. Young
*Assistant Examiner*—Gregory A. Morse
*Attorney, Agent, or Firm*—Antonelli, Terry, Stout & Kraus, LLP

[57] ABSTRACT

A reservoir system for rod-like articles such as cigarettes includes a control system which operates to monitor the maximum time any articles can have remained in the reservoir, and initiates a reservoir emptying cycle when necessary so as to avoid occupation in the reservoir by any articles in excess of a predetermined maximum time. The reservoir may take the form of a reversible conveyor for a stream of articles in multi-layer stack formation, or a module for storing articles in containers including a container loading, unloading and transporting unit. A first-in first-out buffer reservoir may be associated with the main reservoir, and may be provided by a variable length portion of a delivery conveyor leading to the reservoir.

19 Claims, 4 Drawing Sheets

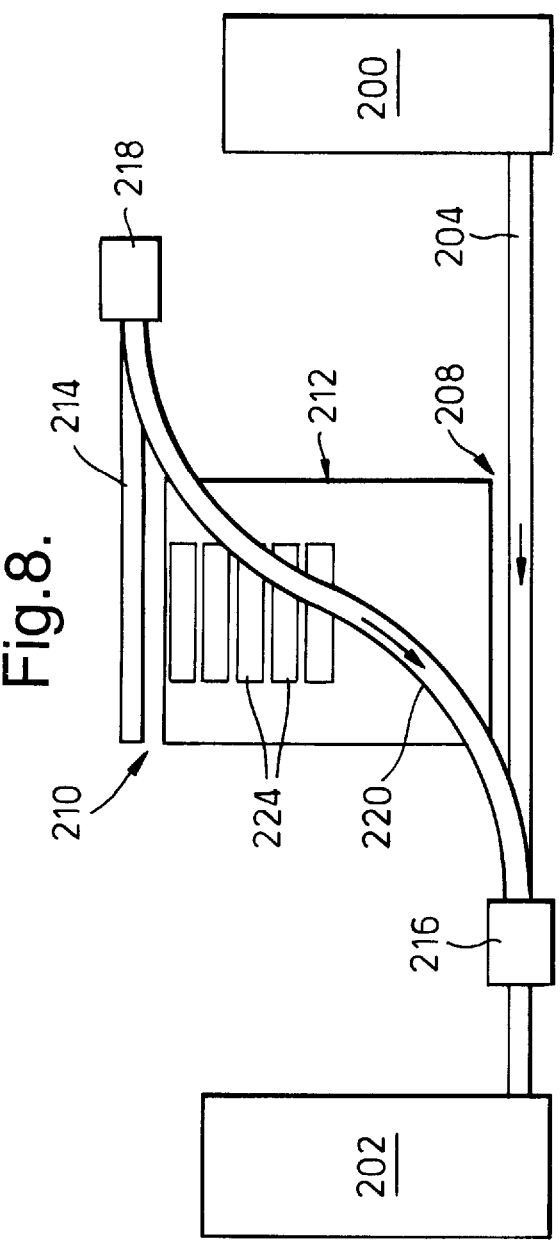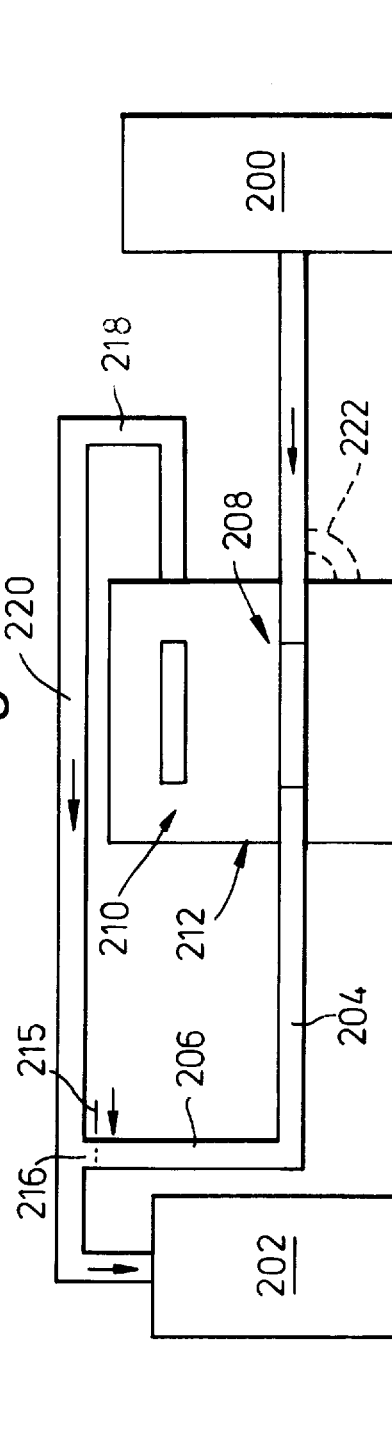

RESERVOIR FOR CIGARETTES WITH
MAXIMUM TIME MONITORING

BACKGROUND OF THE INVENTION

This invention relates to reservoir systems for rod-like articles, particularly articles of the tobacco industry such as cigarettes or filter rods.

In the manufacture of articles of the tobacco industry it is common to transport the articles directly from a delivery device such as a producing machine to a receiving device such as a packing machine, with the articles being conveyed in the form of a continuous multi-layer stream of articles moving in a direction transverse to the lengths of the articles. Typically such streams are 90–100 mm in height. It is known to provide a buffer reservoir for accommodating temporary or longer term differences in the rates of operation of the delivery and receiving devices, such reservoirs often taking the form of conveyor means supporting a variable length multi-layer stream of articles which is moved towards or away from a junction with a similar stream passing directly from the delivery device to the receiving device. Such buffer reservoirs may comprise reversible conveyors provided with an end wall or the like for bounding the leading end of a stream of articles in the reservoir. Examples of reservoirs of this type are disclosed in British patent specifications Nos. 1299174 and 2133759, and also in the Haesons U.S. Pat. No. 5,439,097 and the Brown et al U.S. Pat. No. 5,361,888, to which specifications and application reference is directed in their entireties.

Reversible reservoirs are commonly referred to as first-in last-out devices, because the first articles to enter the device are the last articles to leave the device. Reservoirs for rod-like articles acting on a first-in first-out principle are also known, for example from European patent specification No. 581143A. One perceived advantage of first-in first-out reservoirs is that there is no possibility in normal operation of any articles remaining in the reservoir for an excessive period of time.

SUMMARY OF THE INVENTION

According to a first aspect of the present invention a reservoir system for rod-like articles comprises a delivery device, a receiving device, conveyor means extending between the delivery device and the receiving device including means for conveying a stream of said articles in multi-layer stack formation, variable capacity reservoir means linked to the conveyor means and capable of responding to imbalances in the rate of supply of articles from the delivery device and the demand for articles from the receiving device, and a control system including means for controlling reservoir unloading means so as to prevent any articles remaining in the reservoir for longer than a predetermined maximum time. The reservoir means may store articles in multi-layer stack formation on a conveyor, which may be reversible, or in containers.

According to another aspect of the invention a method of operating a reservoir system for rod-like articles in which a multi-layer stream of articles is reversibly conveyed between a storage region and a delivery conveyor, comprises monitoring the maximum time any articles can have remained in the reservoir, and initiating a reservoir emptying cycle when necessary so as to avoid occupation in the storage region by any articles in excess of a predetermined maximum time. In a preferred mode of operation the time at which and way in which a reservoir emptying cycle is initiated is controlled according to conditions in the system of which the reservoir forms a part. For example, where the reservoir is acting as a buffer reservoir in a conveyor system linking a delivery device (commonly a cigarette making machine) and a receiving device (commonly a cigarette packing machine) one or more of the following operational trends or conditions may be taken into account in an adaptive algorithm which determines when a drain cycle may be initiated:

(i) frequency and duration of stop of delivery device and of receiving device;

(ii) operational speeds of the delivery device and of the receiving device; and (iii) historical level of fill of the reservoir.

In all cases the buffer reservoir must be completely emptied to ensure that no article remains after a drain cycle: in this way the maximum time of occupation of any article can be calculated from the last drain cycle.

In a typical system the buffer reservoir responds to temporary variations in the rates of operation of the delivery and receiving devices. In general, it is possible to overlay this "normal" operation of the buffer reservoir with the additional requirement that a drain cycle be periodically initiated without any excessive disruption of that normal operation: this is achieved by continuously monitoring conditions such as those listed above and arranging for the control algorithm (held in memory in a processor device) to take this into account. Typically the necessary drain cycle can be achieved by small adjustments of the speed of the delivery and/or receiving devices. Generally it is preferred to increase the speed of the receiving device where possible: decreasing the speed of the delivery device is also possible but this implies producing fewer articles than could theoretically be achieved and so results in a loss of measured efficiency.

By way of example, where the delivery device is a cigarette making machine operating at a speed of 14,000 cigarettes per minute (cpm) and the receiving device is a cigarette packing machine operating at a nominal speed of 700 packets (each containing 20 cigarettes) per minute, experience has shown that over an 8 hour shift a reversible reservoir having a maximum capacity of 130,000 cigarettes can be expected to reach each of a full and empty condition some 4 or 5 times with the delivery and receiving devices operating at a typical efficiency of about 85–90%. If it is assumed that the predetermined maximum time which it is required to have cigarettes remain in the reservoir is 4 hours, it will be seen that taking an average condition then the reservoir will reach an empty condition about every 2 hours: at that time a full drain cycle can be initiated ensuring that no cigarettes remain in the reservoir. Monitoring can then continue and no further full drain cycle is necessary for a further 4 hours (although if a reservoir empty condition occurs again after, say, 2 or 3 hours, then the control software may initiate a further drain cycle so as to avoid having to initiate a drain cycle later at a time possibly more disruptive to the normal operation of the reservoir). In other words, the conditions of the reservoir are monitored so as to provide drain cycles at suitable intervals and, whenever possible, with minimum disruption to the system (e.g. initiating drain cycles when the reservoir has reached a near empty condition through normal operation).

In order to avoid excessive disruption of the normal operation of the buffer reservoir, drain cycles may be initiated well in advance. For example, if a drain cycle is initiated with the system referred to in the previous paragraph and the reservoir is half full (i.e. containing 65,000 cigarettes), and if it assumed that the packing machine can be increased in speed by 25 packets/minute (equivalent to 500 cpm), then the time taken to drain the reservoir will be 65,000/500 minutes=2 hours 10 minutes. To this total time will need to be added a short time (say 1 minute) to fully purge the cigarettes from the reservoir (as explained later) so that the total drain time in this case would be 2 hours 11 minutes. It will be understood that this estimate represents an average condition: the exact time taken will depend on operating conditions and will, for example, be affected by slight variations in speeds of the making or packing machines and/or by any interruptions in operation of either machine.

Where the reservoir is linked to a packing machine which offers variable speed control (or speed control in a series of small incremental steps) then it is convenient for a drain cycle to be commenced at a predetermined level of fill of the reservoir, e.g. half full. Under these conditions the packing machine will always run slightly faster than the making machine and the reservoir capacity will only exceed half full if the packing machine stops. The excess speed at which the packer runs relative to the maker will be varied so as to achieve drainage of the reservoir within the predetermined maximum time. If the packing machine stops for an extended period, so resulting in the reservoir moving towards a full state, then in order to achieve a drain cycle it may be necessary to slow or even stop the maker. In the worst case, where the reservoir is full (e.g. containing 130,000 cigarettes) and assuming a maximum packer speed of 14,500 cpm, the drainage time would be about 9 minutes.

In controlling the initiation of the drain cycle the control system provided for performing the method of the present invention typically monitors system conditions and may record that information (e.g. relating to stoppages etc. of the delivery and/or receiving devices and levels of fill of the reservoir against time). Such information may be used additionally for assessing performance of the system and for controlling it, e.g. by adjustment of the speeds of the delivery and receiving devices for optimising performance. The fact that the control system of the invention automatically provides this additional information may therefore provide the user with the incidental benefit of greater operational flexibility.

The control system allows trend analysis of the machine to which the reservoir is linked. For example, the capacity of the reservoir can be used as an indication of the maker/packer balance, so that the speed of the packer can be more closely matched to that of the maker so that an optimum and reasonably constant state of fill of the reservoir can be obtained. Thus, if the reservoir is continuously tending to fill the speed of the packer can be reduced slightly so that the speeds of the maker and packer are better matched.

According to still another aspect of the invention a reservoir system is provided for carrying out the method of the invention, comprising a delivery device, a receiving device, conveyor means for conveying a stream of articles from the delivery device to the receiving device, a reversible reservoir linked to the conveyor means and capable of responding to imbalances in the rate of supply of articles from the delivery device and the demand for articles from the receiving device, so as to receive articles from the conveyor means or return articles to the conveyor means, and a control system including means for initiating a drain cycle so as to prevent any articles remaining in the reservoir for longer than a predetermined maximum time. In a preferred arrangement the reservoir cooperates with a smaller subsidiary reservoir to ensure that all articles are removed from the main reservoir during a drain cycle. The subsidiary reservoir may act in two ways: (i) it can fill to allow the last articles in the main reservoir to be removed irrespective of conditions prevailing in the system at the time, and (ii) it subsequently empties to ensure a flow of articles away from the junction at which the main reservoir connects to the conveyor means, thereby ensuring that all articles removed from the main reservoir flow away to the receiving device and are not returned to the main reservoir when it starts refilling. This subsequent emptying of the subsidiary reservoir and the consequent flow of articles through the junction completes the "purging" of the cigarettes from the main reservoir, referred to earlier.

According to a further aspect of the invention a reservoir system for rod-like articles comprises a delivery device, a receiving device, and conveyor means for conveying a multi-layer stream of articles from the delivery device towards the receiving device, said conveyor means including a junction at which articles may be received from or delivered to a variable capacity reservoir, wherein the conveyor means includes a variable length portion between said delivery device and said junction. Said variable-length portion may constitute a first-in first-out buffer reservoir and in a preferred arrangement comprises a portion of conveyor passing around laterally-movable guide means, substantially similar to that disclosed in the Brown et al U.S. Pat. No. 5,361,888. In a preferred system the reversible reservoir is itself similar to that disclosed in British patent specification No. 1299174 or the Brown et al U.S. Pat. No. 5,361,888. Although the buffer reservoir is located upstream of the junction at which the stream from the reversible reservoir joins the conveyor means, said buffer reservoir can perform the same function as the wheel 8 in the system of the Brown et al U.S. Pat. No. 5,361,888, i.e. that of preventing the imposition of high accelerations and/or excessive or unnecessary movement of the reversible reservoir.

According to a still further aspect of the invention a reservoir system for rod-like articles comprises a delivery device, a receiving device, and conveying means for conveying articles in multi-layer stack formation between the delivery device and the receiving device, wherein the conveying means includes means for loading successive leading portions of the stream into containers, means for conveying containers, and means for unloading containers so that successively unloaded portions of said stream are reformed into a continuous stream for onward conveyance to the receiving device, wherein monitoring means is provided to control said container conveying means so that containers may be unloaded in a predetermined or controlled order, e.g. in the order in which they are loaded. Hence, the controlling means may ensure that the container conveying means, which may contain a variable number of containers, acts as a variable-capacity first-in first-out reservoir. Alternatively, the monitoring means may simply ensure that no portions of the stream remain in containers for longer than a predetermined maximum time. To facilitate this each container may carry means capable of identifying its time of loading and the container conveying means and/or container unloading means may include means for ensuring that containers are unloaded in the correct order and/or no container carrying articles which have remained in the container for an excessive period of time are unloaded. A system and means for achieving this, such as provision of a programmable tag on each container, are disclosed in British patent specification No. 2188601A, to which reference is directed for details.

According to a still further aspect of the invention a reservoir system for rod-like articles comprises a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from the other guide means so as to vary the capacity of the reservoir. In a preferred arrangement said at least one set of guide means comprises a series of vertically-spaced arcuate guide elements, the other set of guide means comprising vertically-spaced wheels.

The different aspects of the invention herein may be combined in any combination, and in particular any of the reservoir systems referred to herein may be operated in accordance with the methods referred to herein.

BRIEF DESCRIPTION OF THE DRAWINGS

Reference is hereinafter made, by way of example only, to the accompanying diagrammatic drawings, in which:

FIG. 8 is a plan view of part of a further cigarette making and packing system, FIG. 9 is a side view of the system of FIG. 8.

DESCRIPTION OF THE PREFERRED EMBODIMENTS

Figure 1:
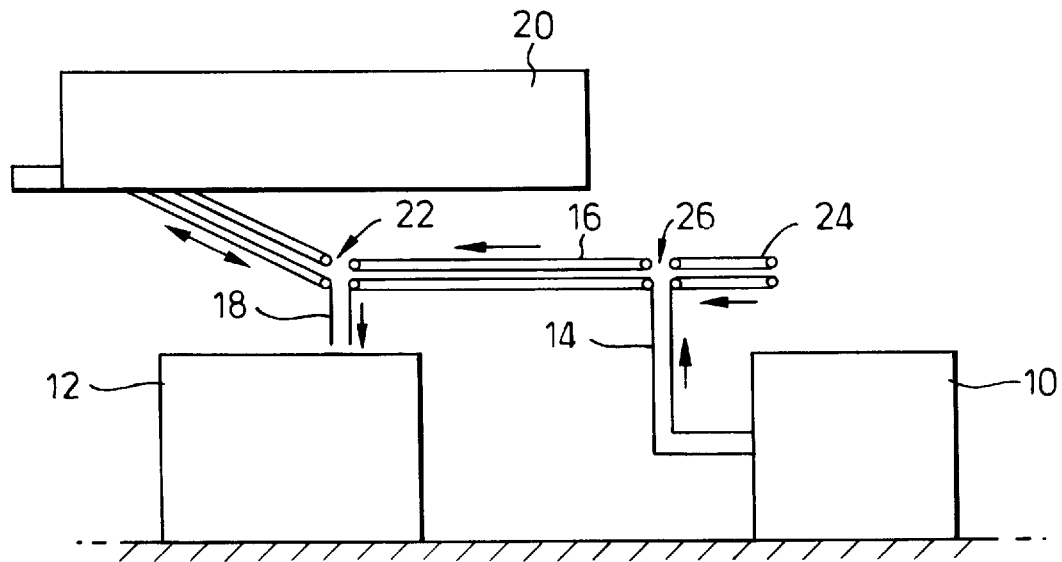
FIG. 1 shows a cigarette making and packing system.

In FIG. 1 a cigarette making machine 10 is linked to a cigarette packing machine 12 by a conveyor system including an elevator 14, horizontal conveyor 16 and downdrop 18. A relatively large capacity reversible reservoir 20 is connected to the conveyor 16 and downdrop 18 at a junction 22. The reservoir 20 may be of the type disclosed in the Brown et al U.S. Pat. No. 5,361,888. A relatively small capacity reversible reservoir 24 is connected to the elevator 14 and conveyor 16 at a further junction 26. The capacity of the reservoir 20 may typically be 130,000 cigarettes, that of the reservoir 24 typically, say, 2,000 cigarettes.

Figure 2:
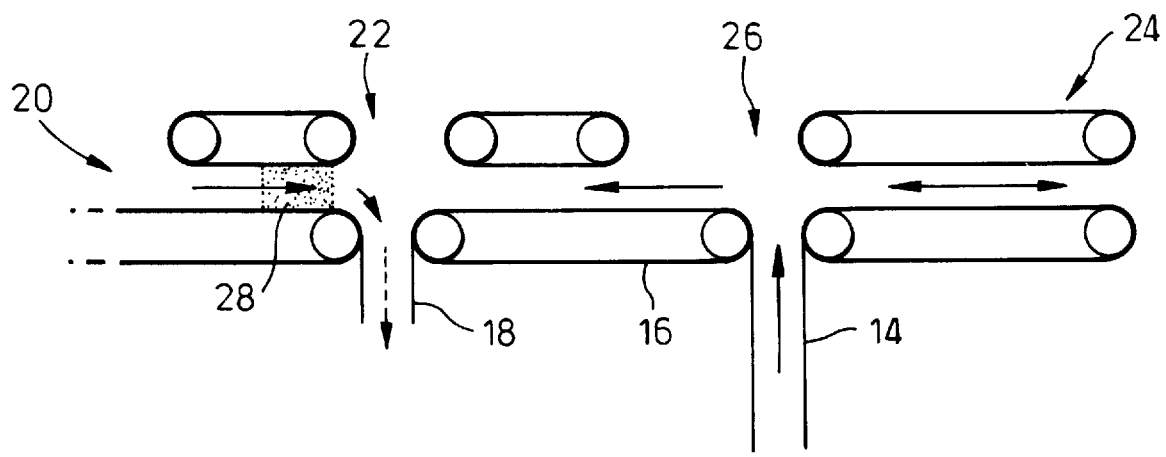
FIG. 2 shows in more detail the conveyors of the system of FIG. 1.

As shown in FIG. 2 the reservoir 20 has an end wall 28 for bounding the leading end of a stream of cigarettes extending into the reservoir. The end wall 28 may comprise a flexible element intended to be conveyed with the conveyor of the reservoir 20 and capable of extending right up to the junction 22. Thus, after a drain cycle has been completed the end wall 28 has advanced almost to the junction 22 (as shown in FIG. 2). During advancement of the end wall 28 to this position the small reservoir 24 will have absorbed some cigarettes. After the end wall 28 has reached its stop position the reservoir 24 will partially empty, thereby ensuring flow of all cigarettes in the region of the junction 22 down into the downdrop 18. Subsequently the reservoir 24 is driven to an empty condition (its normal condition) to initiate movement of the end wall 28 into the main reservoir 20. Normal operation of the system now recommences, with the control system software ensuring that the reservoir 20 is refilled to a preferred capacity (say half full) as far as operating conditions allow, so that the reservoir can provide protection for temporary speed imbalances of both the making machine 10 and the packing machine 12.

The small reservoir 24 may be replaced by a buffer reservoir positioned at any convenient location communicating with the cigarette flow to and from the main reservoir 20. The form of the small reservoir 24 may differ from that shown: for example a reservoir similar to that disclosed in British patent specification No. 2163717 may be employed.

Figure 3:
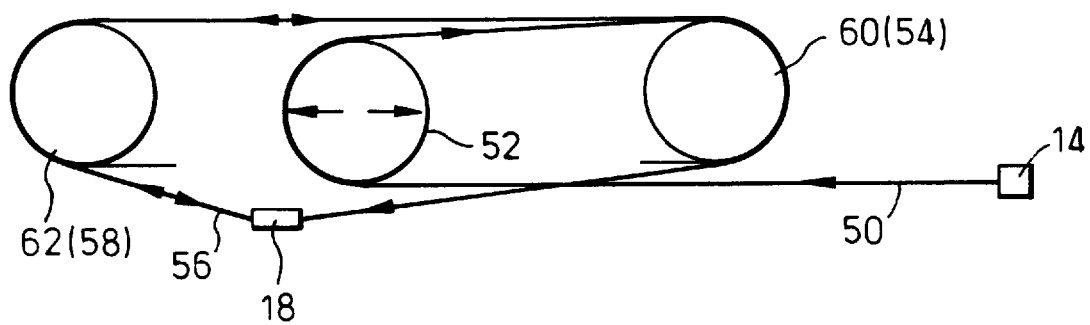
FIG. 3 is a plan view of part of another cigarette making and packing system.
Figure 4:
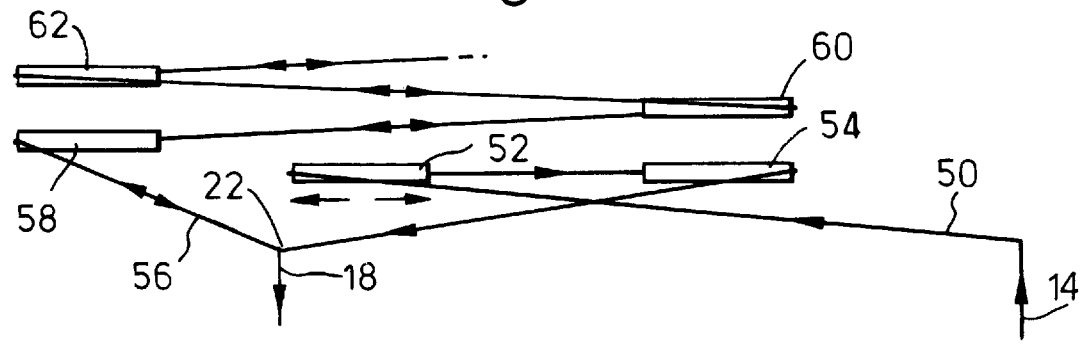
FIG. 4 is a side view of the system shown in FIG. 3.

The system shown in FIGS. 3 and 4 includes an elevator 14 leading from a cigarette making machine (not shown) and a downdrop 18 leading to a packing machine (not shown). A conveyor 50 conveying a multi-layer stream extends from the elevator 14 and passes around first and second wheels 52, 54 and then to the junction 22 with the packer downdrop 18. A reversible conveyor 56 extends in the other direction from the junction 22 and passes to a further wheel 58 and then in a generally helical path around wheels 60, 62, etc, in a manner generally similar to that disclosed in British patent specification No. 1299174 or in the Brown et al U.S. Pat. No. 6,361,888.

The wheel 52 is movable in a generally horizontal direction, so as to lengthen or shorten the path of the conveyor 50 upstream of the junction 22. In this way a first-in first-out variable capacity reservoir is provided in the path to the packer downdrop 18. Movement of the wheel 52 may be achieved in a manner analogous to movement of the wheel 8 in the system disclosed in the above mentioned Brown et al patent.

Note that the lower most wheel 58 of the reversible reservoir formed by the conveyor 56 is not movable back and forth as is the wheel 8 in said specification No. 2263680: however, movement of the wheel 52 is capable of performing the same function, i.e. prevention of excessive acceleration or too frequent movement of the conveyor 56 of the main reversible reservoir, and in addition performs the function of the small capacity reversible reservoir 24 in the system of FIG. 1.

Total movement of the wheel 52 may be up to about 2 meters, corresponding to a difference in capacity between its extreme positions of about 5,000 cigarettes.

All of the control features described with reference to the system of FIGS. 1 and 2 may similarly be applied to the system described with reference to FIGS. 3 and 4.

Figure 5:
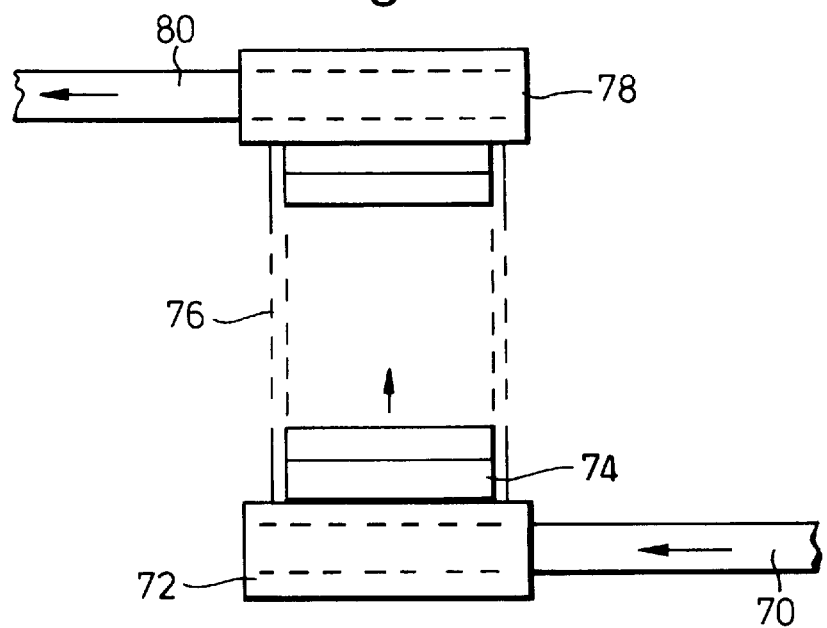
FIG. 5 is a plan view of part of a still further cigarette making and packing system.

FIG. 5 shows a further system, in which a stream of cigarettes in mass flow formation is conveyed from a making machine (not shown) on a conveyor 70 to a loading unit 72 at which successive leading portions of the mass flow stream are loaded into one or more containers or trays 74 which are transported along a path 76 to an unloading unit 78 at which said portions are recombined to form a mass flow stream which is conveyed to a packing machine (not shown) by way of a further conveyor 80. The form of the loading unit 72 and unloading unit 78 may be similar to that disclosed in British patent specification No. 1404141, to which reference is directed for details.

The system of FIG. 5 is controlled such that trays 74 are unloaded according to predetermined requirements, e.g. in the same order as that in which they are loaded, i.e. so that the path 76 (which may be other than a simple conveyor as indicated) acts as a variable capacity first-in first-out reservoir for the stream passing from the making machine to the packing machine. In order to achieve this each tray 74 may carry a programmable tag or other device capable of recording time of loading at the unit 72. Thus the unit 72 may include a write device and unit 78 a read device to facilitate control as required.

The system shown in FIGS. 8 and 9 has substantial similarities with that of FIG. 5 and extends between a cigarette making machine 200 and a cigarette packing machine 202. A mass flow conveyor 204, which includes an elevator 206, extends between the machines 200 and 202 and conveys a continuous stream of cigarettes in multi-layer stack formation. A container loading unit 208 is located adjacent to the conveyor 204 and serves to load cigarettes from the conveyor 204 into containers 224 when required. Containers carrying cigarettes are transported from the loading unit 208 towards a container unloading unit 210 by means of a container transport unit 212. Cigarettes unloaded from containers at the unloading unit 210 are reformed into a continuous mass flow stream on a conveyor 214 which extends to a junction 216 with the conveyor 204 at the top of the elevator 206. The conveyor 214 includes an elevator 218 and a portion 220 having an S-shape in plan.

Figure 10:
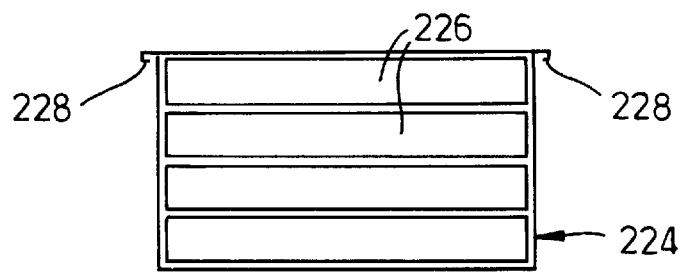
FIG. 10 is a side view of a container usable in the systems of FIG. 5 and FIG. 8.

As shown particularly in FIG. 10, each container 224 comprises four compartments 226, each capable of holding a stack of cigarettes having the same height as the stream on conveyor 204. Typically each compartment 226 may hold about 1250 cigarettes. Each container 224 has side ledges 228 at its upper corners, from which the containers may be suspended on rails (not shown) in the transporting unit 212. The trays 74 used in the system of FIG. 5 may be similar to the containers 224.

The form of the loading unit 208 and unloading unit 210 may be similar to that disclosed in British patent specification No. 1404141, to which reference is directed for details. Thus, compared with that system, the system shown in FIGS. 8 and 9 of the present application differs in that not all of the cigarettes flowing from the making machine 200 are loaded into containers, although that mode of operation would be possible and for such purpose a closable gate 215 is provided to extend across the top of the elevator 206 at the junction 216. The gate 215 may be similar to that disclosed in British patent specification No. 2157253, to which reference is directed for details.

As indicated diagrammatically in the drawing, the loading unit 208 receives batches of cigarettes directly from the conveyor 204. Alternatively, the loading unit 208 could operate from a conveyor 222 which branches from the main conveyor 204. In this way it would not be necessary to insert dividers of the type disclosed in said specification No. 1404141 into the stream of cigarettes on the main conveyor 204.

Operation of the system shown in FIGS. 8 and 9 is similar to that of the system of FIG. 5 except that generally the majority of cigarettes produced by the making machine 200 pass directly to the packing machine 202 by way of the direct path along conveyor 204. Cigarettes are only loaded into containers at the loading unit 208 when the production of the making machine 200 exceeds the requirements of the packing machine 202. Similarly, cigarettes are unloaded from containers at the unloading unit 210 when the requirements of the packing machine 202 exceed the production at the making machine 200. In addition, the system is controlled such that containers are unloaded according to predetermined requirements, e.g. in the same order as that in which they are loaded, i.e. so that the transport unit 212 for containers acts as a variable capacity first-in first-out reservoir. In order to achieve this each container may carry a programmable tag or other device capable of recording time of loading at the unit 208. Thus the unit 208 may include a write device and the unit 210 a read device to facilitate control as required. Furthermore, the system may operate such that containers are automatically unloaded at the unit 210 a predetermined time after loading or production: in this way no cigarettes should remain unpacked for an excessive period. Reference is directed to said British patent specification No. 2188601A for further details of provision of write and read devices in a container system for rod-like articles.

Figure 6:
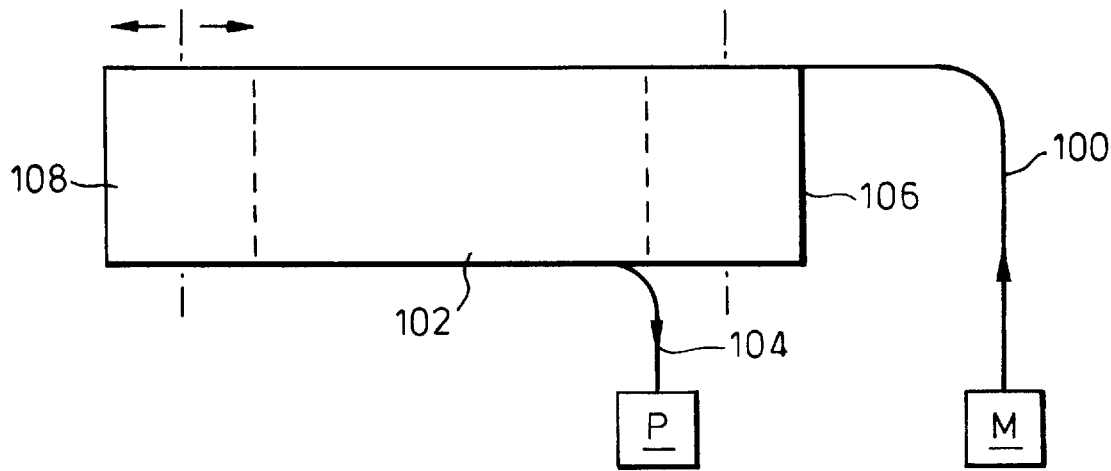
FIG. 6 is a side view of part of a still further cigarette making and packing system.
Figure 7:
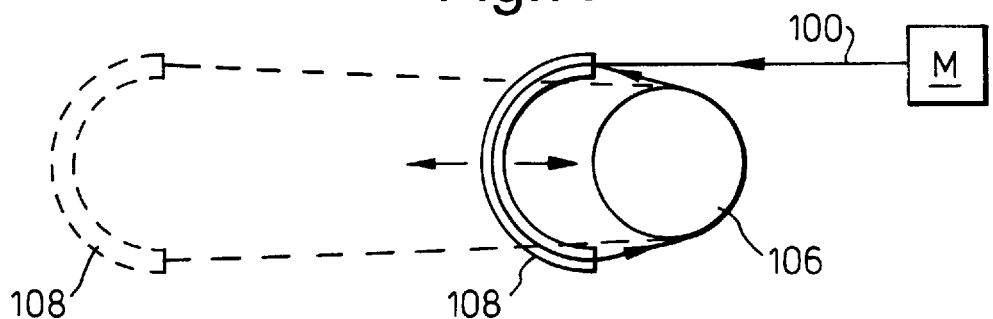
FIG. 7 is a plan view of the system of FIG. 6.

FIGS. 6 and 7 show a still further system, in which a mass flow stream of cigarettes passes from a making machine M to an elevating conveyor 100 which leads the stream to a first-in first-out reservoir 102, from which an output stream is delivered to a downdrop 104 and packing machine P. The reservoir 102 comprises a reservoir conveyor extending downwards in a generally helical path passing round horizontally spaced sets of guide members 106, 108. The guide members 106 comprise vertically spaced wheels, similar to those used in said specification No. 1299174 and in the Brown et al U.S. Pat. No. 5,361,888. The guide members 108 could also comprise wheels but preferably comprise arcuate guides around which the conveyor passes. The vertically spaced guide members 108 are movable towards and away from the wheels 106, as indicated in the drawings, to vary the capacity of the reservoir 102. The advantage of using curved guide members 108 for the movable part of the reservoir is apparent from FIG. 7, from which it is clear that the minimum capacity of the reservoir can be lower with such an arrangement because the arcuate guides can approach the wheels 106 more closely.

As with the system of FIGS. 3 and 4 a tensioning and gathering means (not shown) is provided for maintaining tension in the reservoir conveyor and for gathering excess conveyor as necessary when the reservoir is in other than its maximum capacity conditions. Such tensioning and gathering means may be similar to that disclosed in said Brown et al U.S. Pat. No. 5,361,888.

We claim:

1. A reservoir system for rod-like articles, comprising a delivery device, a receiving device, conveyor means extending between the delivery device and the receiving device including means for conveying a stream of said articles in multi-layer stack formation, variable capacity reservoir means linked to the conveyor means and capable of responding to imbalances in the rate of supply of articles from the delivery device and the demand for articles from the receiving device, and a control system having means for controlling reservoir unloading including means for preventing any articles remaining in the reservoir for longer than a predetermined maximum time.

2. A system as claimed in claim 1, wherein the reservoir means comprises a variable length reservoir conveyor for conveying a variable length stream of rod-like articles in multi-layer stack formation.

3. A system as claimed in claim 2, wherein the variable length reservoir conveyor is reversibly movable to convey said stream to or from a junction with said conveying means.

4. A system as claimed in claim 1, wherein said variable capacity reservoir means comprises means for conveying articles in containers.

5. A method of operating a reservoir system for rod-like articles in which a multi-layer stream of articles is reversibly conveyed between a storage region and a delivery conveyor, comprising monitoring the maximum time any articles can have remained in the reservoir, and initiating a reservoir emptying cycle when necessary so as to avoid occupation in the storage region by any articles in excess of a predetermined maximum time.

6. A method as claimed in claim 5, wherein the reservoir forms part of a conveyor system linking a delivery device and a receiving device, including the step of monitoring at least one of the frequency, duration of stop and operational speeds of the delivery device and of the receiving device, and initiating a reservoir emptying cycle in accordance with said monitoring step.

7. A method as claimed in claim 6, wherein the step of initiating of a reservoir emptying cycle includes the step of increasing the speed of the receiving device.

8. A method as claimed in claim 5, including the step of monitoring the level of fill of the reservoir and initiating a reservoir emptying cycle in accordance with said monitoring step.

9. A reservoir system, comprising a delivery device, a receiving device, conveyor means for conveying a stream of articles from the delivery device to the receiving device, a reversible reservoir linked to the conveyor means and capable of responding to imbalances in the rate of supply of articles from the delivery device and the demand for articles from the receiving device, so as to receive articles from the conveyor means or return articles to the conveyor means, and a control system having means for monitoring the maximum time any articles can have remained in the reservoir, and means for initiating an emptying cycle including means for preventing any articles remaining in the reservoir for longer than a predetermined maximum time.

10. A system as claimed in claim 9, including a subsidiary reservoir which cooperates with said reversible reservoir, and means for causing said subsidiary reservoir to receive articles whereby said reversible reservoir may be emptied irrespective of conditions prevailing in the system.

11. A system as claimed in claim 10, wherein said reversible reservoir and said subsidiary reservoir are linked to said conveyor means at adjacent junctions, whereby unloading of articles from said subsidiary reservoir is capable of promoting the flow of articles at the junction of said reversible reservoir.

12. A reservoir system comprising a delivery device, a receiving device, and conveyor means for conveying a multi-layer stream of articles from the delivery device towards the receiving device, said conveyor means including a junction at which articles may be received from or delivered to a variable capacity reservoir, wherein the conveyor means includes a variable length portion between said delivery device and said junction, wherein said variable length portion comprises a first-in first-out buffer reservoir.

13. A system as claimed in claim 12, wherein the variable length portion comprises a portion of conveyor passing around laterally-spaced guide means.

14. A reservoir system for rod-like articles, comprising a delivery device, a receiving device, and conveying means for conveying articles in multi-layer stack formation between the delivery device and the receiving device, wherein the conveying means includes means for loading successive leading portions of the stream into containers, means for conveying containers, and means for unloading containers so that successively unloaded portions of said stream are reformed into a continuous stream for onward conveyance to the receiving device, wherein monitoring means is provided to control said container conveying means so that containers may be unloaded in a predetermined or controlled order, said monitoring means including means for determining that no portions of the stream remain in containers for longer than a predetermined maximum time.

15. A system as claimed in claim 14, wherein the container conveying means comprises a variable capacity first-in first-out reservoir.

16. A system as claimed in claim 14, wherein each container carries means capable of identifying its time of loading and the container conveying means and/or container unloading means includes means for ensuring that containers are unloaded in a predetermined order within a predetermined maximum time from the time of loading.

17. A reservoir system for rod-like articles, particularly for conveying articles between a producing device and a receiving device, includes first conveyor means for conveying a stream of articles in multi-layer stack formation in a direction transverse to their lengths along a first path extending between the producing device and the receiving device, and second conveyor means for conveying articles transferred from said first path along a second path extending between the producing device and the receiving device, said second conveyor means including means for conveying articles in containers, wherein control means is provided to determine the unloading of containers, said control means including means for monitoring the length of time which articles spend in the reservoir in containers and means responsive to said monitoring means for unloading articles from said reservoir so that no articles can remain in said reservoir for longer than a predetermined maximum time.

18. A system as claimed in claim 17, wherein the control means provides that containers are unloaded in the same order that they are loaded, so that the second path provides a first-in first-out buffer reservoir for articles in containers.

19. A reservoir system for rod-like articles, comprising a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from another of said guide means in another of said sets so as to vary the capacity of the reservoir, wherein the set of said at least one guide means comprises a series of vertically-spaced arcuate guide elements, the other set of guide means comprising vertically-spaced wheels, and wherein at least one of the arcuate guide elements defines an enclosed space which at least partly includes a corresponding wheel when the guide element and wheel are in their most proximate positions.

* * * * *